United States Patent
Hibino et al.

(10) Patent No.: US 9,573,534 B2
(45) Date of Patent: Feb. 21, 2017

(54) TOOL STORAGE DEVICE USED IN A VEHICLE

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Youbun Hibino, Aichi-ken (JP); Mitsuaki Eshima, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/721,196

(22) Filed: May 26, 2015

(65) Prior Publication Data

US 2015/0336516 A1  Nov. 26, 2015

(30) Foreign Application Priority Data

May 26, 2014 (JP) ................. 2014-108067

(51) Int. Cl.
B60R 11/06 (2006.01)
B60R 7/02 (2006.01)
B62D 43/10 (2006.01)
B60R 11/00 (2006.01)

(52) U.S. Cl.
CPC ................. *B60R 11/06* (2013.01); *B60R 7/02* (2013.01); *B60R 2011/0036* (2013.01); *B62D 43/10* (2013.01)

(58) Field of Classification Search
CPC .... B60R 11/03; B60R 7/02; B60R 2011/0036; B62D 43/10
See application file for complete search history.

(56) References Cited

U.S. PATENT DOCUMENTS

| | | | | |
|---|---|---|---|---|
| 5,429,285 A * | 7/1995 | Kim | ................. | B62D 43/10 206/373 |
| 7,036,697 B2 * | 5/2006 | Hwang | ................. | B62D 43/10 206/373 |

FOREIGN PATENT DOCUMENTS

JP  2001-206152  7/2001

* cited by examiner

*Primary Examiner* — Glenn Dayoan
*Assistant Examiner* — Melissa A Black
(74) *Attorney, Agent, or Firm* — Greenblum & Bernstein, P.L.C.

(57) ABSTRACT

A tool storage device includes a tool storage portion fitted to a spare tire and having an opening and a tool storage bottom surface and shaped such that an opening size of the opening is greater than an area of the tool storage bottom surface, and the tool storage portion includes a middle storage portion and first and second side storage portions. The middle storage portion has a middle storage bottom surface and side walls and receives an elongated tool, and one of the side walls has a holder to hold the elongated tool. The first side storage portion has a first side storage bottom surface that is above a second side storage bottom surface of the second side storage portion. The middle storage bottom surface is below the second side storage bottom surface, and the first and second side storage bottom surfaces are above the holder.

11 Claims, 5 Drawing Sheets

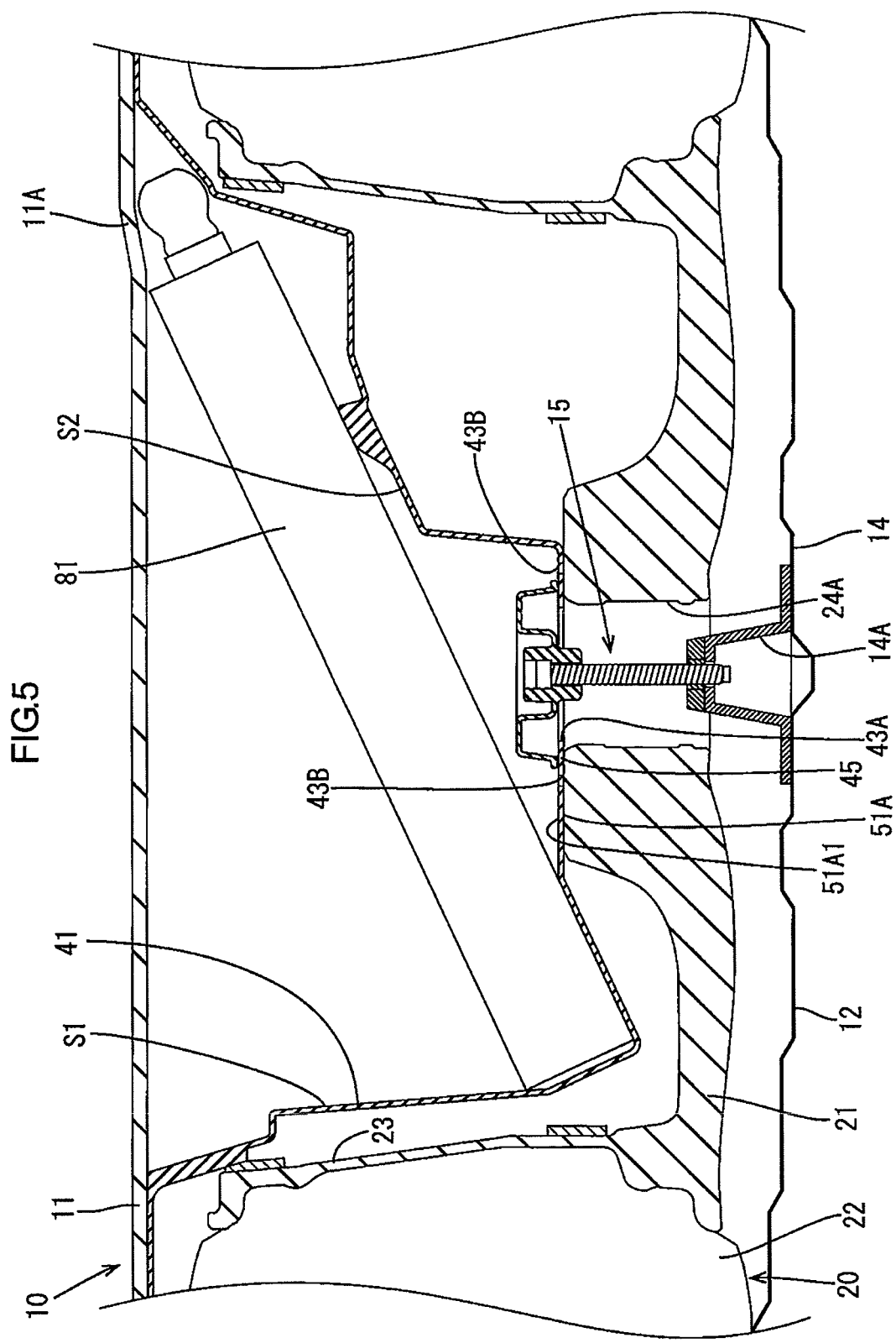

TOOL STORAGE DEVICE USED IN A VEHICLE

CROSS REFERENCE TO RELATED APPLICATION

This application claims priority from Japanese Patent Application No. 2014-108067 filed May 26, 2014. The entire contents of the priority application are incorporated herein by reference.

FIELD OF THE INVENTION

The present disclosure relates to a tool storage device used in a vehicle.

BACKGROUND OF THE INVENTION

A floor board covering a recessed storage room in a vehicular luggage compartment has been known. A spare tire, a floor board, and a floor mat are arranged in such a recessed storage room sequentially from the bottom, for example. Tools are stored in a storage area of the floor board. A luggage compartment tool storage device has been known as a component in which the tools are stored, and such a luggage compartment tool storage device is arranged between the floor board and the spare tire.

SUMMARY OF THE INVENTION

Such a luggage compartment tool storage device is arranged above a spare tire in the recessed storage room. The spare tire generally has a recess including a substantially cylindrical inner surface and a bottom surface having an inner space therein. The spare tire is arranged in the recessed storage room such that the recess opens upward and a part of the luggage compartment tool storage device is arranged in the recess. Thus, the luggage compartment tool storage device is arranged in a small space.

However, in such a configuration, a volume of a tool storage space of the luggage compartment tool storage device where the tools are arranged depends on a volume of the inner space of the recess of the spare tire. Accordingly, it has been demanded to arrange the tools effectively in a limited space for storing the tools.

An objective of the present technology is to provide a tool storage device that stores tools effectively in a vehicle.

To solve the above problems, a tool storage device used in a vehicle includes a tool storage portion shaped to be fitted in a wheel recess of a spare tire and having a tool storage space to receive tools therein, the tool storage portion being a recess opening upward and having an opening and a tool storage bottom surface, and the tool storage portion being shaped such that an opening size of the opening is greater than an area of the tool storage bottom surface, and the tool storage portion includes a middle storage portion and side storage portions including a first side storage portion and a second side storage portion so as to sandwich the middle storage portion with respect to a short dimension of the middle storage portion. The middle storage portion has an elongated shape including a middle storage bottom surface and side walls and has a middle storage space to receive an elongated tool therein, and the middle storage portion includes a center of the tool storage portion, and one of the side walls has a holder to hold the elongated tool. The first side storage portion has a first side storage bottom surface that is above a second side storage bottom surface of the second side storage portion. The middle storage bottom surface is below the second side storage bottom surface, and the first side storage bottom surface and the second side storage bottom surface are above the holder.

BRIEF DESCRIPTION OF THE DRAWINGS

FIG. 5 is a cross-sectional view illustrating the tool storage device taken along line V-V in FIG. 3.

DETAILED DESCRIPTION OF EMBODIMENTS

Figure 1:
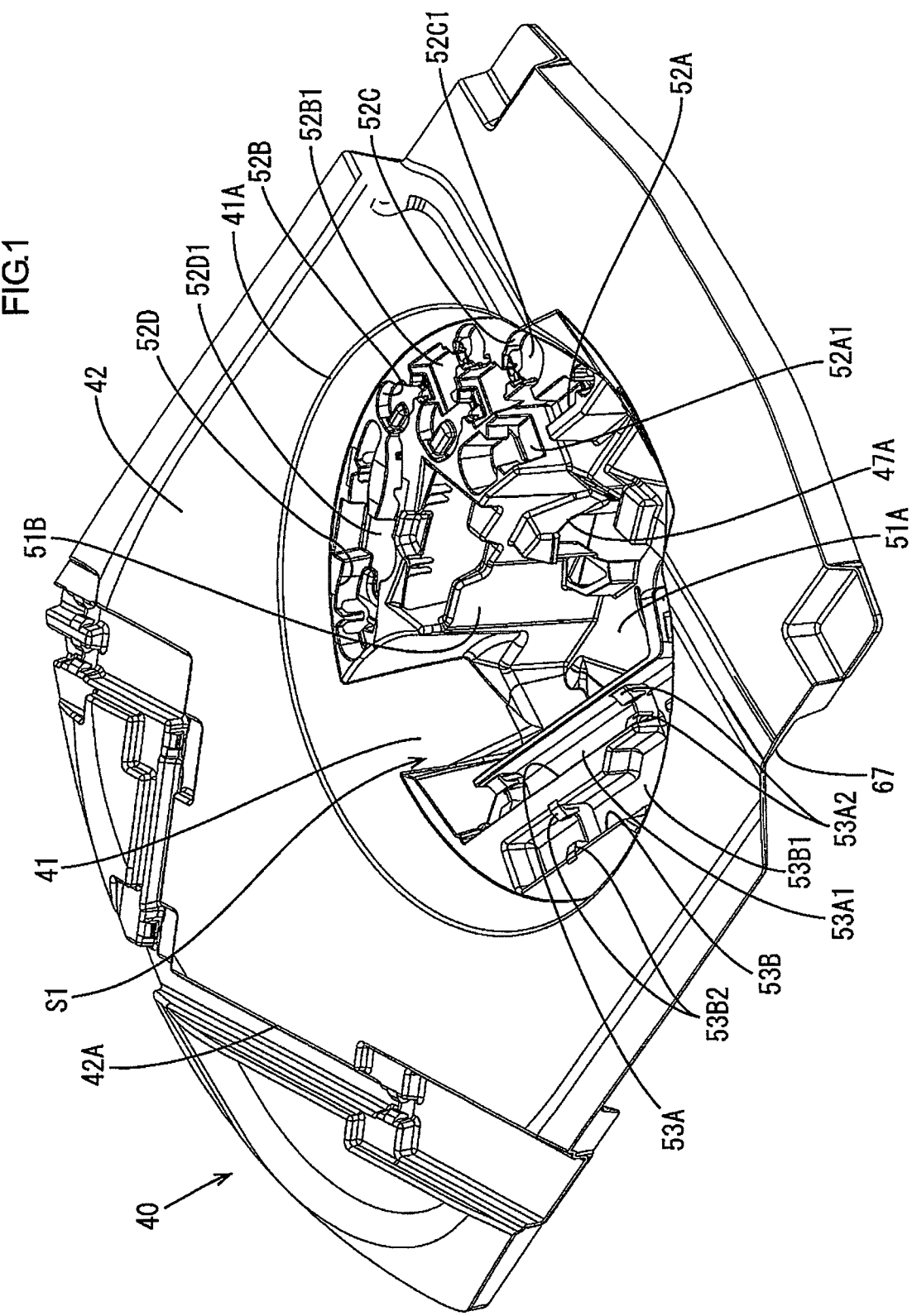
FIG. 1 is a perspective view illustrating a tool storage device in a vehicle according to one embodiment of the present technology.

One embodiment of the present technology will be described with reference to FIGS. 1 to 5. A tool storage device 40 in FIG. 1 is arranged below a floor board 11 that constitutes a floor surface in a vehicular luggage room 10, as illustrated in FIG. 4.

A floor panel 12 (a floor pan) is placed below the floor board 11 (below a compartment storage room) and includes a storage recess 13 that is open upward. The tool storage device 40 is arranged above a spare tire 20 within the storage recess 13.

Figure 4:
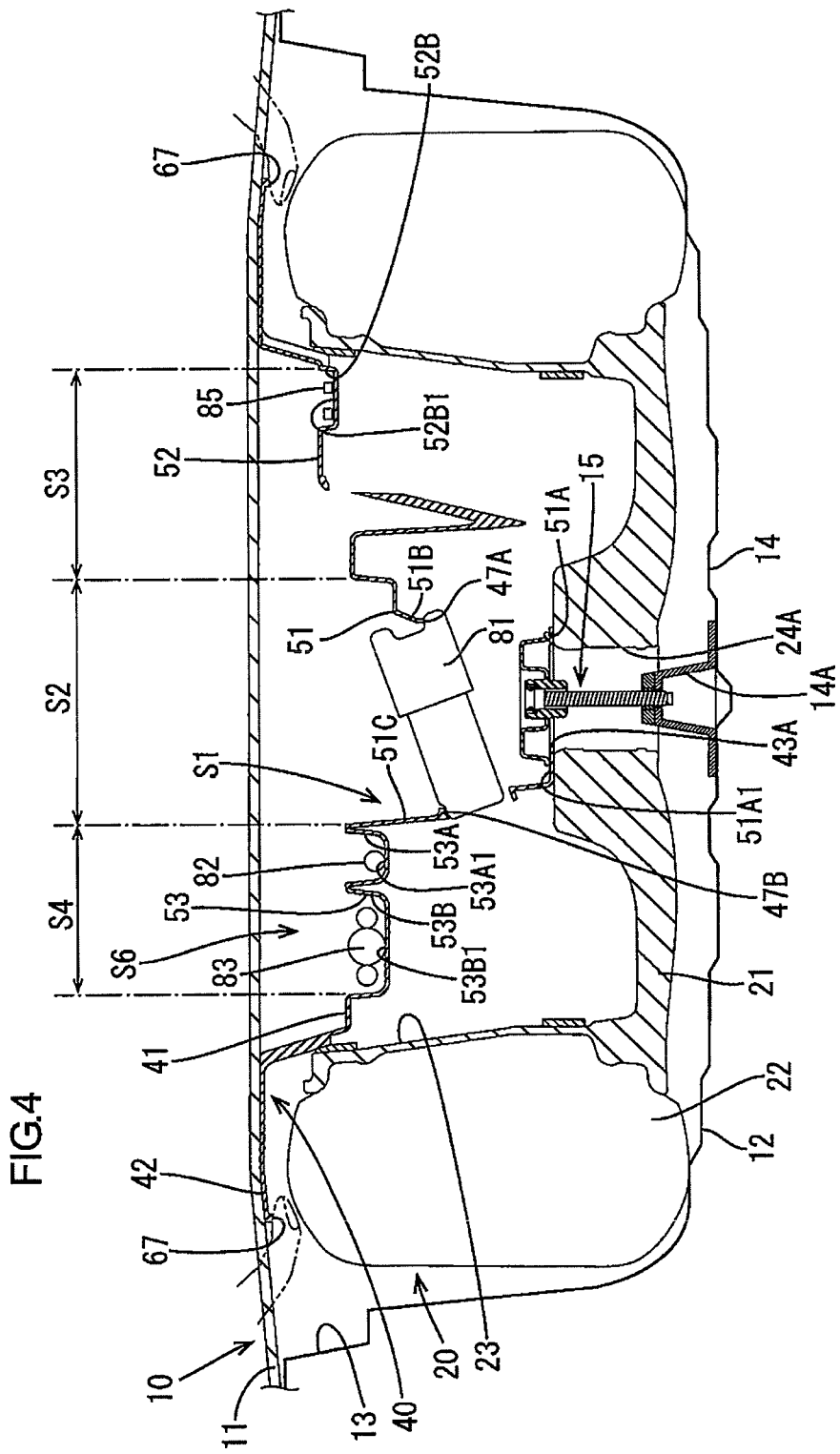
FIG. 4 is a cross-sectional view illustrating the tool storage device taken along line IV-IV in FIG. 3.

As illustrated in FIG. 4, the spare tire 20 includes a wheel 21 and a tire main body 22 having a ring shape. The wheel 21 has a wheel recess 23 and the spare tire 20 is arranged in the storage recess 13 such that the wheel recess 23 opens upward. The wheel recess 23 of the wheel 21 has a circular truncated cone shape such that a diameter thereof increases as a side wall of the wheel recess 23 extends upward. Namely, the wheel recess 23 has a shape such that a horizontal cross sectional size of the side wall increases as the side wall extends upward.

The tool storage device 40 may be made of synthetic resin and molded with injection molding. A material and a manufacturing method of the tool storage device 40 are not limited thereto.

The tool storage device 40 includes a tool storage portion 41 where tools are stored and a peripheral end portion 42 that extends horizontally from an upper edge of the tool storage portion 41, that is a peripheral annular opening edge 41A of the tool storage portion 41. The tool storage portion 41 is a recess that is recessed downward and is fitted to the wheel recess 23 of the wheel 21 from the above. Namely, the tool storage portion 41 is within the wheel recess 23 and in a space defined by the tire main body 22 and the wheel 21.

Figure 2:
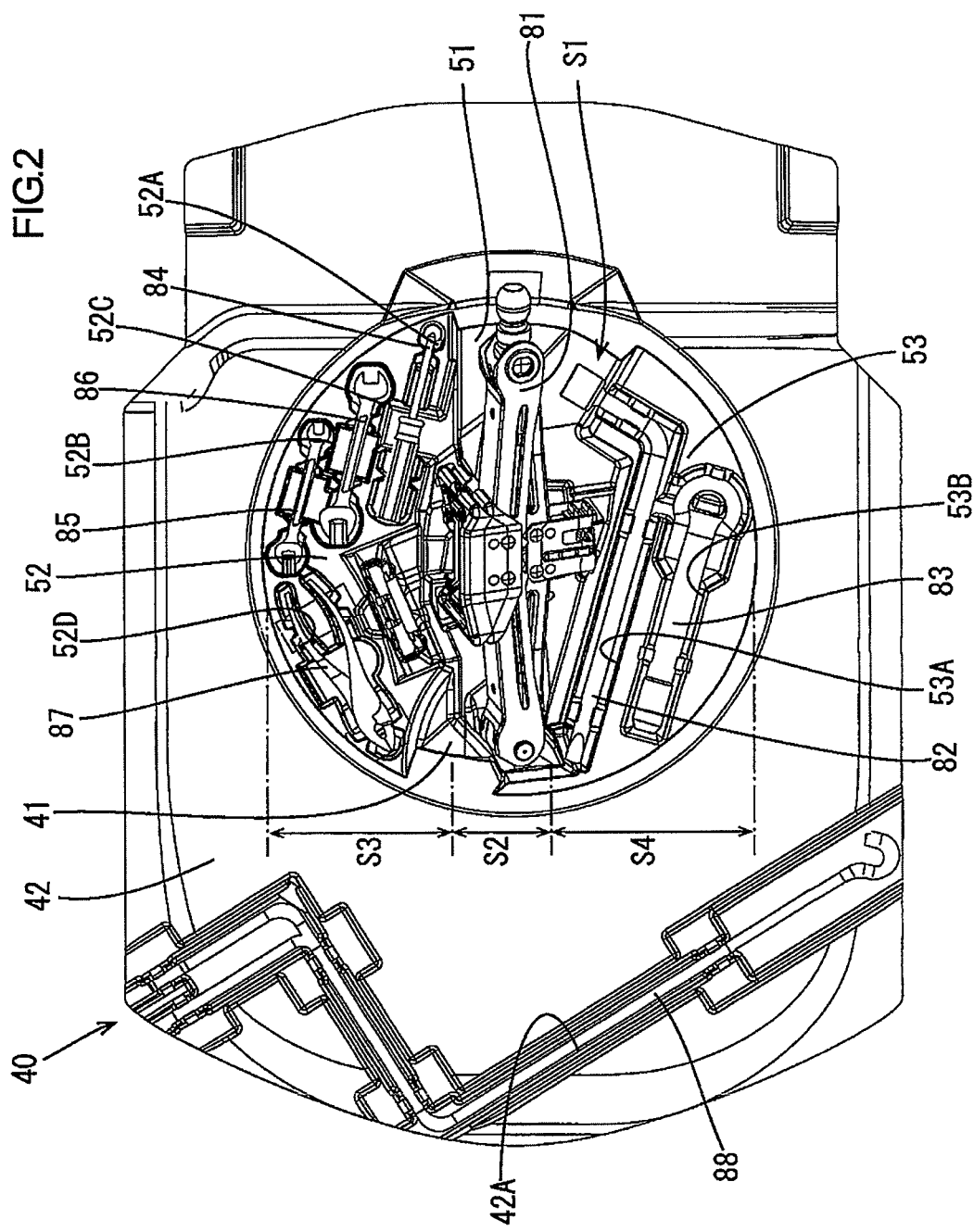
FIG. 2 is a plan view illustrating the tool storage device storing tools therein.
Figure 3:
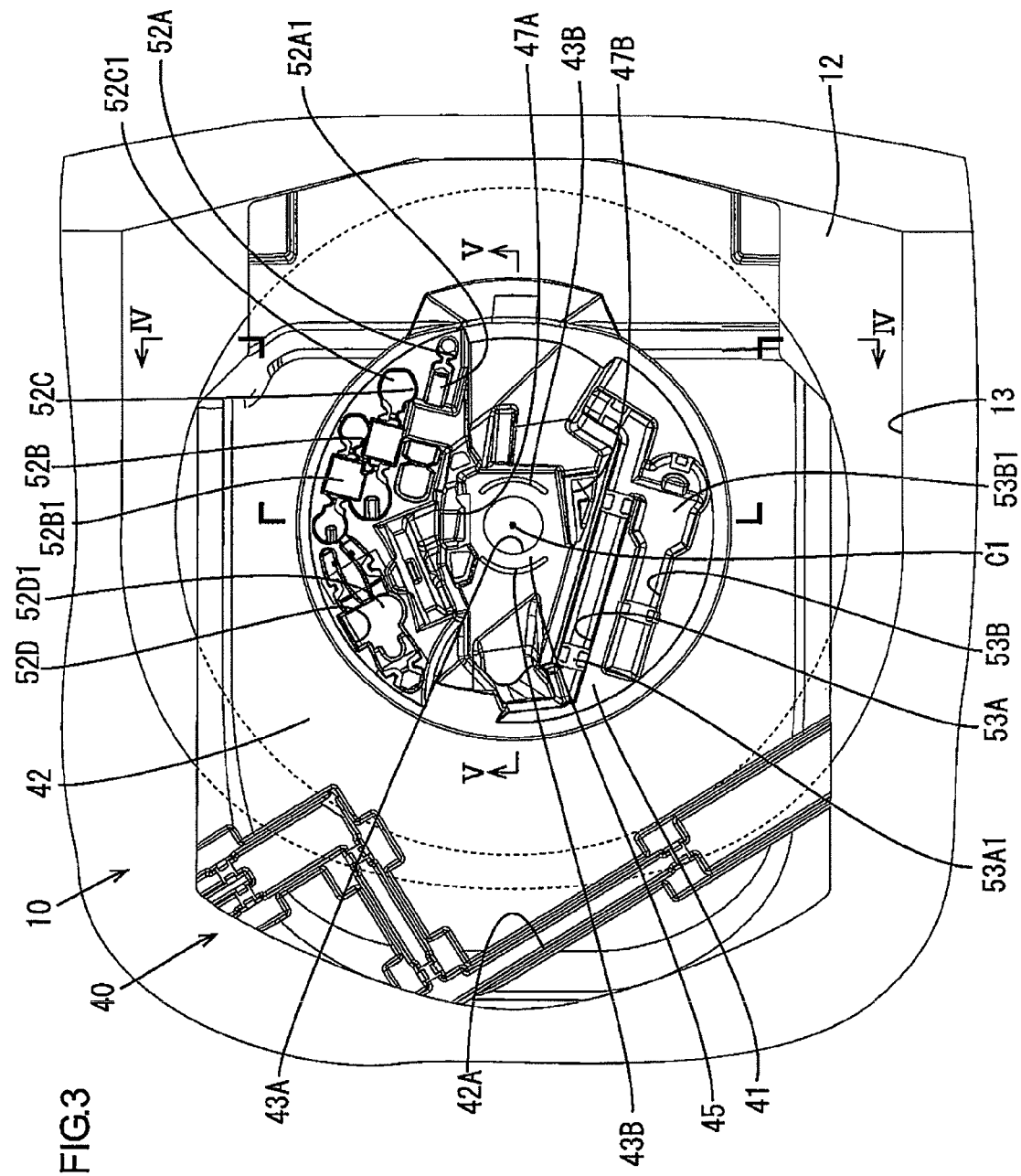
FIG. 3 is a plan view illustrating the tool storage device storing no tools.

The peripheral end portion 42 has a plate-like shape and has a substantially rectangular outer plan view shape. As illustrated in FIGS. 1 and 3, the peripheral end portion 42 extends from the entire upper edge of the tool storage portion 41, which is the peripheral annular opening edge 41A, and is supported on an opening edge of the storage recess 13, which is a part of the floor panel 12. The peripheral end portion 42 includes a storage groove 42A in a vehicular front end portion thereof (a left end portion in FIG. 2) and a jack handle 88 is arranged in the storage groove 42A.

As illustrated in FIG. 1, the peripheral end portion 42 has a cutout 67 in a vehicular width side edge portion at a rear end. An operator easily inserts his/her finger under the peripheral end portion 42 from the cutout 67 to remove the tool storage device 40 (see FIG. 4).

The tool storage portion 41 has a substantially box-shape that is open upward and has a round opening that follows an opening edge of the wheel recess 23 in a plan view. Tools are arranged in an inner space of the tool storage portion 41. As illustrated in FIGS. 1 and 2, the tool storage portion 41 has a tool storage space S1 where the tools are stored and has a plan view circular opening and the tool storage portion 41 has the peripheral annular opening edge 41A. As illustrated in FIG. 4, the tool storage portion 41 includes a bottom portion 51A that is a center portion thereof and the bottom portion 51A is in contact with the wheel 21. The bottom portion 51A and the wheel 21 are fixed to a bottom portion 14 of the storage recess 13 with a fixing member 15 such as bolts. Accordingly, the tool storage device 40 is fixed to the floor panel 12 together with the spare tire 20.

Specifically, the fixing member 15 is inserted through a storage device through hole 43A formed in the bottom portion 51A and a wheel through hole 24A formed in the wheel 21 to be tightened to a seat 14A of the bottom portion 14 at a lower end thereof. The wheel through hole 24A is a hub hole where a hub of a vehicle is inserted.

As illustrated in FIG. 3, the bottom portion 51A further includes elongated through holes 43B around the storage device through hole 43A. Each of the elongated through holes 43B has an arch-shaped opening that extends along a hole edge portion 45 of the storage device through hole 43A.

The hole edge portion 45 including the elongated through holes 43B has low rigidity and is deformable in an upper-lower direction (a plate thickness direction). The elongated through holes 43B correspond to a level adjust portion that changes a level of the hole edge portion 45.

According to such a configuration, when the thickness of the wheel 21 changes depending on variation of a kind of the spare tire 20, the level of the hole edge portion 45 is changed so that the hole edge portion 45 is in contact with an upper surface of the wheel 21. As a result, no gap is generated between the hole edge portion 45 and the wheel 21, and the tool storage device 40 and the spare tire 20 are firmly fixed to the bottom portion 14 of the storage recess 13 with the fixing member 15.

In this embodiment, the tools such as a jack 81, a hub nut wrench 82, a towing hook 83, a driver 84, a mini spanner 85, a large spanner 86, and a plyer 87 are arranged in the tool storage space S1 of the tool storage portion 41. Specifically, the tool storage portion 41 has recesses formed to have shapes (tool fitting recesses) following shapes of the tools, and each tool is fitted to a corresponding tool fitting recess.

Next, a configuration of the tool storage portion 41 will be described in detail. As illustrated in FIG. 4, the tool storage portion 41 includes a middle storage portion 51 in a middle with respect to a vehicular width direction and side storage portions 52, 53 that are located to sandwich the middle storage portion 51 therebetween with respect to the vehicular width direction (a right-left direction in FIG. 4).

As illustrated in FIG. 4, the middle storage portion 51 has a substantially U-shape opening upward. The middle storage portion 51 is elongated in a vehicular front-rear direction and has a middle storage space S2 where the jack 81 is arranged. The middle storage portion 51 includes a center C1 of the tool storage portion 41 in a plan view (see FIG. 3). The middle storage portion 51 extends from a portion of the peripheral annular opening edge 41A of the tool storage portion 41 to another portion of the peripheral annular opening edge 41A that is opposite to the one portion with respect to the center C1. Namely, the middle storage portion 51 has a length substantially equal to a diameter of the round opening of the tool storage portion 41.

As illustrated in FIG. 5, the bottom portion 51A of the middle storage portion 51, which defines the middle storage space S2, has steps that are lowered as is closer to the vehicular front side (the left side in FIG. 5). The jack 81 (an elongated tool) is arranged in the middle storage space S2 of the middle storage portion 51 along the vehicular front-rear direction and slanted such that a vehicular rear end portion of the jack 81 is located higher than a vehicular front end portion thereof. The jack 81 is a longest one of the tools that are arranged in the tool storage portion 41.

As illustrated in FIGS. 1 and 4, the middle storage portion 51 includes the bottom portion 51A and side walls 51B, 51C. The side walls 51B, 51C have holding through holes 47A, 47B, respectively, as a holder and the jack 81 is fitted in the holding through holes 47A, 47B and held by opening edges of the through holes 47A, 47B. The jack 81 that is arranged in the tool storage portion 41 is adjustable in its vehicular width dimension (length in the vehicular width direction, in a right-left direction in FIG. 4).

After the jack 81 is adjusted to be a smaller size in the vehicular width direction (the right-left direction in FIG. 4) and is arranged in the tool storage portion 41 as illustrated in FIG. 4, the jack 81 is deformed to increase the vehicular width dimension thereof. Accordingly, the vehicular width dimension of the jack 81 is held in the corresponding holding through holes 47A, 47B.

According to such a configuration, the jack 81 is firmly held in the tool storage portion 41 without providing an exclusive fixing member. The jack 81 is held in the holding through holes 47A, 47B and thus rigidity of the tool storage portion 41 is increased. In this embodiment, as illustrated in FIG. 5, a portion of the floor board 11 corresponding to a vehicular rear-side portion of the jack 81 is located higher than other portion thereof.

As illustrated in FIG. 2, the side storage portion 52 of the tool storage portion 41 is on the right side with respect to the middle storage portion 51 and with respect to the vehicular running direction. The side storage portion 52 includes tool fitting recesses 52A, 52B, 52C, 52D each of which is open upward. Each of the tool fitting recesses 52A, 52B, 52C, 52D has an inner space therein and the side storage portion 52 has a first side storage space S3 including the inner spaces of the tool fitting recesses 52A, 52B, 52C, 52D.

In this embodiment, the driver 84 is fitted in the tool fitting recess 52A, and the mini spanner 85 is fitted in the tool fitting recess 52B. The large spanner 86 is fitted in the tool fitting recess 52C, and the plyer 87 is fitted in the tool fitting recess 52D.

The side storage portion 53 of the tool storage portion 41 is on the left side with respect to the middle storage portion 51 and with respect to the vehicular running direction. The side storage portion 53 includes tool fitting recesses 53A, 53B each of which is open upward. Each of the tool fitting recesses 53A, 53B has an inner space therein and the side storage portion 53 has a second side storage space S4 including the inner spaces of the tool fitting recesses 53A, 53B. In this embodiment, the hub nut wrench 82 is fitted in the tool fitting recess 53A, and the towing hook 83 is fitted in the tool fitting recess 53B.

Each of the tool fitting recesses has a pair of projections on opposing inner surfaces thereof. The tool fitted in each tool fitting recess is held by the pair of projections to be fixed in each tool fitting recess. As illustrated in FIG. 1, examples of the pair of projections include projections 53A2 disposed in the tool fitting recess 53A as a holder for holding the tool and projections 53B2 disposed in the tool fitting recess 53B as the holder.

When the hub nut wrench 82 is pushed into the tool fitting recess 53A to be fitted therein, the pair of projections 53A2 are elastically deformed to be away from each other such that a distance between the pair of projections 53A2 is increased. Accordingly, the hub nut wrench 82 is fitted in the tool fitting recess 53A between the pair of projections 53A2.

The tool storage portion 41 has a shape such that a size of an outer circumference of the horizontal cross section thereof decreases as is closer to a lower side or the bottom portion 51A. According to such a configuration, the tool storage portion 41 is easily removed from a molding die in a process of molding the tool storage portion 41. Further, the tool storage portion 41 is easily mounted in and removed from the wheel recess 23 of the wheel 21 (a fitting recess where the tool storage portion 41 is fitted).

The tool storage portion 41 has a shape such that a size of an inner circumference of the horizontal cross section thereof also decreases as is closer to a lower side or the bottom portion 51A corresponding to the size of the outer circumference of the horizontal cross section thereof. Namely, as illustrated in FIG. 4, the tool storage portion 41 is formed such that an opening size of the horizontal cross section thereof increases as is closer to the upper side. As illustrated in FIGS. 2 and 4, the tool storage space S1 in the tool storage portion 41 includes the middle storage space S2, the first side storage space S3 and the second side storage space S4. The side storage portions 52, 53 are located to sandwich the middle storage portion 51 therebetween with respect to a short dimension of the middle storage portion 51 (the vehicular width direction, the upper-lower direction in FIG. 2).

The tool fitting recesses 52A, 52B, 52C, 52D have bottom surfaces 52A1, 52B1, 52C1, 52D1, respectively, and the tool fitting recesses 53A, 53B have bottom surfaces 53A1, 53B1, respectively. The bottom surfaces 52A1, 52B1, 52C1, 52D1 are above the bottom surfaces 53A1, 53B1, as illustrated in FIGS. 3 and 4.

FIG. 4 illustrates the bottom surface 53A1 of the tool fitting recess 53A, the bottom surface 53B1 of the tool fitting recess 53B and the bottom surface 52B1 of the tool fitting recess 52B.

The middle storage portion 51 has a bottom surface 51A1, and the bottom surface 51A1 is below the bottom surface 53A1 and the bottom surface 53B1. The bottom surface 51A1 is located at the lowest level among the bottom surfaces included in the tool storage portion 41.

The bottom surfaces 52A1, 52B1, 52C1, 52D1 of the tool fitting recesses 52A, 52B, 52C, 52D and the bottom surfaces 53A1 and 53B1 of the tool fitting recesses 53A, 53B are above the holding through holes 47A, 47B, and especially above upper opening edges of the holding through holes 47A, 47B.

In this embodiment, the tool storage portion 41 having the tool storage space S1 therein includes three storage portions including the middle storage portion 51 having the middle storage space S2, the side storage portion 52 having the first side storage space S3, and the side storage portion 53 having the second side storage space S4. The middle storage portion 51 has an elongated shape that includes the center C1 of the tool storage portion 41 that has a circular shape in an upper plan view. Therefore, the middle storage portion 51 has an elongated dimension within a range of a diameter of the tool storage portion 41 and has the longitudinal dimension that is longer than that of the side storage portions 52, 53. Namely, the middle storage portion 51 has the middle storage space S2 that is greater in the longitudinal dimension thereof than the first side storage space S3 and the second side storage space S4 of the side storage portions 52, 53. Accordingly, an elongated tool such as the jack 81 can be arranged in the middle storage portion 51.

The bottom surfaces 52A1, 52B1, 52C1, 52D1 of the side storage portion 52 having the first side storage space S3 are above the bottom surfaces 53A1, 53B1 of the side storage portion 53 having the second side storage space S4.

In this embodiment, the tool storage portion 41 is fitted in the wheel recess 23 of the wheel 21. The wheel recess 23 has a circular truncated cone shape having an opening size greater than an area of a bottom portion thereof. The tool storage portion 41 is designed to be fitted to the wheel recess 23 so that the opening size of the tool storage portion 41 is greater than an area of the bottom portion 51A. According to such a configuration, a bottom surface of a storage portion can be set to be greater as the bottom surface is located at an upper level in the tool storage portion 41 having the tool storage space S1.

According to the above configuration, areas of the bottom surfaces 52A1, 52B1, 52C1, 52D1 of the side storage portion 52 having the first side storage space S3 can be greater than those of the bottom surfaces of the side storage portion 52 that are on the same level as the bottom surfaces 53A1, 53B1 of the side storage portion 53 having the second side storage space S4. Accordingly, a great number of tools or a large tool can be arranged in the side storage portion 52 having the first side storage space S3.

If the bottom surfaces of the side storage portion 53 are set to be on the same level as the bottom surfaces 52A1, 52B1, 52C1, 52D1 of the side storage portion 52 having the first side storage space S3, the bottom surfaces of the side storage portion 53 have greater areas than the bottom surfaces 53A1, 53B1 of the side storage portion 53. However, as the levels of the bottom surfaces 53A1, 53B1 becomes higher, a distance between the floor board 11 and the bottom surfaces 53A1, 53B1 becomes small, that is, a space above the tool fitting recesses 53A, 53B becomes smaller. Therefore, the storing space in the vehicular luggage compartment becomes small.

In this embodiment, the bottom surfaces 53A1, 53B1 are below the bottom surfaces 52A1, 52B1, 2C1, 52D1. According to such a configuration, a space S6 between the floor board 11 and the tool fitting recesses 53A, 53B (see FIG. 4) is less likely to become smaller. Namely, a volume of the vehicular luggage compartment measured with the VDA method is less likely to be decreased. In this embodiment, the tool storage portion 41 having the tool storage space S1 is defined into at least three storage portions including the middle storage portion 51 having the middle storage space S2 and the side storage portions 52, 53 having the first side storage space S3 and the second side storage space S4, respectively. The levels of the bottom surfaces of the middle storage portion 51 and the side storage portions 52, 53 are varied so that the tools are stored in the storage portions effectively.

The elongated tool is the jack 81 and the middle storage portion 51 having the middle storage space S2 where the jack 81 is arranged has a shape that is elongated in the vehicular front-rear direction.

The jack 81 is a longer one of the tools that are arranged in the tool storage device 40 and is effectively arranged in the middle storage portion 51 having the elongated shape. The jack 81 is arranged in the middle storage portion 51 that is elongated in the vehicular front-rear direction and is arranged therein along the vehicular front-rear direction. This provides good design seen from the vehicular rear side.

In this embodiment, as illustrated in FIG. 5, the jack 81 that is in the middle storage portion 51 is tilted so that the length thereof in the vehicular front-rear direction is decreased to be fitted in the tool storage portion 41 having the tool storage space S1. If a longer jack is arranged in the tool storage portion 41, an upper end thereof may projects upwardly from the storage recess 13. In such a case, the floor board 11 includes a step portion 11A (see FIG. 5) so that the upper end of the longer jack 81 may not hit the floor board 11. If the floor board 11 includes the step portion 11A only in a portion thereof corresponding to the upper end of the longer jack 81, the design thereof may be deteriorated. Therefore, the step portion 11A extends in the vehicular width direction.

If the middle storage portion 51 extends in the vehicular width direction and the jack 81 is arranged along the vehicular width direction such that the upper end thereof projects upwardly from the storage recess 13, the step portion extends in the vehicular front-rear direction. In such a configuration, when a person sees the vehicular luggage room 10 from the rear side, the step portion is easily recognized and this may deteriorate the design of the floor board 11. In this embodiment, the middle storage portion 51 extends in the vehicular front-rear direction and the jack 81 is arranged along the vehicular front-rear direction. Therefore, the step portion 11A extends in the vehicular width direction, and the step portion may be less likely to be recognized when a person sees the vehicular luggage room 10 from the rear side. Accordingly, the design of the floor board 11 is less likely to be deteriorated.

The bottom surface 51A1 of the middle storage portion 51 having the middle storage space S2 is below the bottom surfaces 53A1, 53B1 of the side storage portion 53 having the second side storage space S4. Accordingly, the middle storage portion 51 has increased depth and a tool having a great size such as the jack 81 can be effectively stored therein.

Other Embodiments

The present technology is not limited to the description as described above with reference to the drawings. For example, the present technology may include following embodiments.

(1) The tool storage device 40 may not necessarily have the shape described in the above embodiment and may have a different shape. The tools stored in the tool storage portion 41 may not be limited to those in the above embodiment and the shapes of the tool storage portion 41 may be altered according to the shapes of the tools to be stored therein.

(2) The arrangement of each of the tools in the tool storage portion 41 may not be necessarily limited to the one in the above embodiment but may be altered. The hub nut wrench 82 may be arranged in the middle storage portion 51 having the middle storage space S2. The holding portion that holds the jack 81 may not be necessarily the holding through holes 47A, 47B but may be recesses.

The invention claimed is:

1. A tool storage device used in a vehicle comprising:
   a tool storage portion shaped to be fitted in a wheel recess of a spare tire and having a tool storage space to receive tools therein, the tool storage portion being a recess opening upward and having an opening and a tool storage bottom surface, and the tool storage portion being shaped such that an opening size of the opening is greater than an area of the tool storage bottom surface, the tool storage portion including:
   a middle storage portion having an elongated shape including a middle storage bottom surface and side walls and having a middle storage space to receive an elongated tool therein, the middle storage portion including a center of the tool storage portion, and a first one of the side walls having a holding through-hole where a part of the elongated tool is to be fitted;
   side storage portions including a first side storage portion and a second side storage portion so as to sandwich the middle storage portion with respect to a short dimension of the middle storage portion, the first side storage portion having a first side storage bottom surface that is above a second side storage bottom surface of the second side storage portion, wherein
   the middle storage bottom surface is below the second side storage bottom surface, and
   the first side storage bottom surface and the second side storage bottom surface are above the holding through-hole.

2. The tool storage device according to claim 1, wherein the middle storage portion has the elongated shape extending in a vehicular front-rear direction.

3. The tool storage device according to claim 1, wherein the middle storage bottom surface is elongated and tilted so that one end portion thereof is higher than another end portion thereof.

4. The tool storage device according to claim 1, wherein
   the opening of the tool storage portion is a round opening and the tool storage portion has a peripheral annular opening edge, and
   the middle storage portion extends from one portion of the peripheral annular opening edge to another portion of the peripheral annular opening edge that is opposite to the one portion with respect to the center.

5. The tool storage device according to claim 1, wherein
   the first side storage portion stores one of a spanner, a driver, and a plyer, and
   the second side storage portion stores one of a hub nut wrench and a hook.

6. The tool storage device according to claim 1, wherein the middle storage bottom surface has a mount portion that is to be fixed to a floor panel via a bottom portion of the wheel recess.

7. The tool storage device according to claim 4, wherein the tool storage portion includes a peripheral end portion around the peripheral annular opening edge, the peripheral end portion extending horizontally from the peripheral annular opening edge and being placed on a floor panel.

8. The tool storage device according to claim 7, wherein the peripheral end portion has a storage groove to store a tool.

9. The tool storage device according to claim 1, wherein a second one of the side walls is positioned opposite the first one of the side walls, said second one of the side walls having a holding through-hole where a part of the elongated tool is to be fitted.

10. The tool storage device according to claim 1, wherein the opening of the tool storage portion has a peripheral opening edge,
   the middle storage portion has a depth from the peripheral opening edge to the middle storage bottom surface, the first side storage portion has a depth from the peripheral opening edge to the first side storage portion bottom surface,
the second side storage portion has a depth from the peripheral opening edge to the second side storage bottom surface, and
the depth of the middle storage portion is greater than the depth of the first side storage portion and is greater than the depth of the second side storage portion.

11. The tool storage device according to claim 4, wherein the tool storage portion includes a peripheral end portion around the peripheral annular opening edge, the peripheral end portion extending horizontally from the peripheral annular opening edge to be placed on a tire main body of the spare tire.

\* \* \* \* \*